US005907143A

United States Patent [19]

Goodwin, III

[11] Patent Number: 5,907,143

[45] Date of Patent: May 25, 1999

[54] METHOD OF DISPLAYING A PROMOTIONAL MESSAGE BY AN ELECTRONIC PRICE LABEL

[75] Inventor: John C. Goodwin, III, Suwanee, Ga.

[73] Assignee: NCR Corporation, Dayton, Ohio

[21] Appl. No.: 08/726,596

[22] Filed: Oct. 7, 1996

[51] Int. Cl.[6] .................... G06K 15/00

[52] U.S. Cl. .................... 235/383

[58] Field of Search .................... 235/383

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,172,314 | 12/1992 | Poland et al. | 364/401 |
| 5,448,226 | 9/1995 | Failing, Jr. et al. | 340/825.35 |
| 5,461,561 | 10/1995 | Ackerman et al. | 235/383 |
| 5,465,085 | 11/1995 | Caldwell et al. | 235/383 |
| 5,572,653 | 11/1996 | De Temple et al. | 235/383 |
| 5,583,487 | 12/1996 | Ackerman et al. | 235/383 |

*Primary Examiner*—Harold I. Pitts
*Attorney, Agent, or Firm*—Paul W. Martin; Peter H. Priest

[57] ABSTRACT

A method of displaying a promotional message by electronic price label which uses a promotional indicator. The promotional message is stored with the promotional indicator in a first location. The promotional indicator is stored in a second location. A control message addressed to the EPL is created by reading the promotional indicator for the EPL from the second location and reading the promotional message from the first location. The control message to the EPL is transmitted. The control message is received by the EPL. Finally, the promotional message is displayed by the EPL. The first location may be a price look-up (PLU) file and/or an EPL data file.

14 Claims, 3 Drawing Sheets

METHOD OF DISPLAYING A PROMOTIONAL MESSAGE BY AN ELECTRONIC PRICE LABEL

CROSS-REFERENCE TO RELATED APPLICATION

The present invention is related to the following commonly assigned and co-pending U.S. applications:

"Method Of Displaying A Product Restriction Message By An Electronic Price Label", filed Oct. 7, 1996 invented by Goodwin, and having a Ser. No. 08/726,595; and "Method Of Displaying A Government Program Message By An Electronic Price Label", filed Oct. 7, 1996, invented by Goodwin, and having a Ser. No. 08/726,594.

BACKGROUND OF THE INVENTION

The present invention relates to electronic signage, and more specifically to a method of displaying a promotional message by an electronic price label (EPL).

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

During special promotions, EPL systems display promotional messages using paper shelf talkers or bibs. However, these shelf talkers must be installed manually, thereby increasing the cost and setup time associated with special promotions.

Therefore, it would be desirable to provide a method of displaying promotional information by an EPL that avoids the use of paper shelf talkers.

SUMMARY OF THE INVENTION

In accordance with the teachings of the present invention, a method of displaying a promotional message by an electronic price label (EPL) is provided.

A method of displaying a promotional message by an electronic price label (EPL) includes the steps of storing the promotional message with a promotional indicator associated with the promotional message in a first location, storing the promotional indicator in a second location, creating a control message addressed to the EPL including the substeps of reading the promotional indicator for the EPL from the second location and reading the promotional message from the first location, transmitting the control message to the EPL, receiving the control message by the EPL, and displaying the promotional message by the EPL.

The second location may be a price look-up (PLU) file in which the promotional indicator is stored within the record of the item. The second location may also be an EPL data file in which the promotional indicator is stored within a record of the EPL. In the latter case, the promotional indicator may be copied from the PLU file to the EPL data file.

It is accordingly an object of the present invention to provide a method of displaying a promotional message by an EPL.

It is another object of the present invention to provide a method of displaying a promotional message by an EPL that makes paper shelf talkers unnecessary.

It is another object of the present invention to provide a method of displaying a promotional message by an EPL that displays special text or graphics.

It is another object of the present invention to provide a method of displaying a promotional message by an EPL that makes use of a promotional indicator in a price look-up file.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
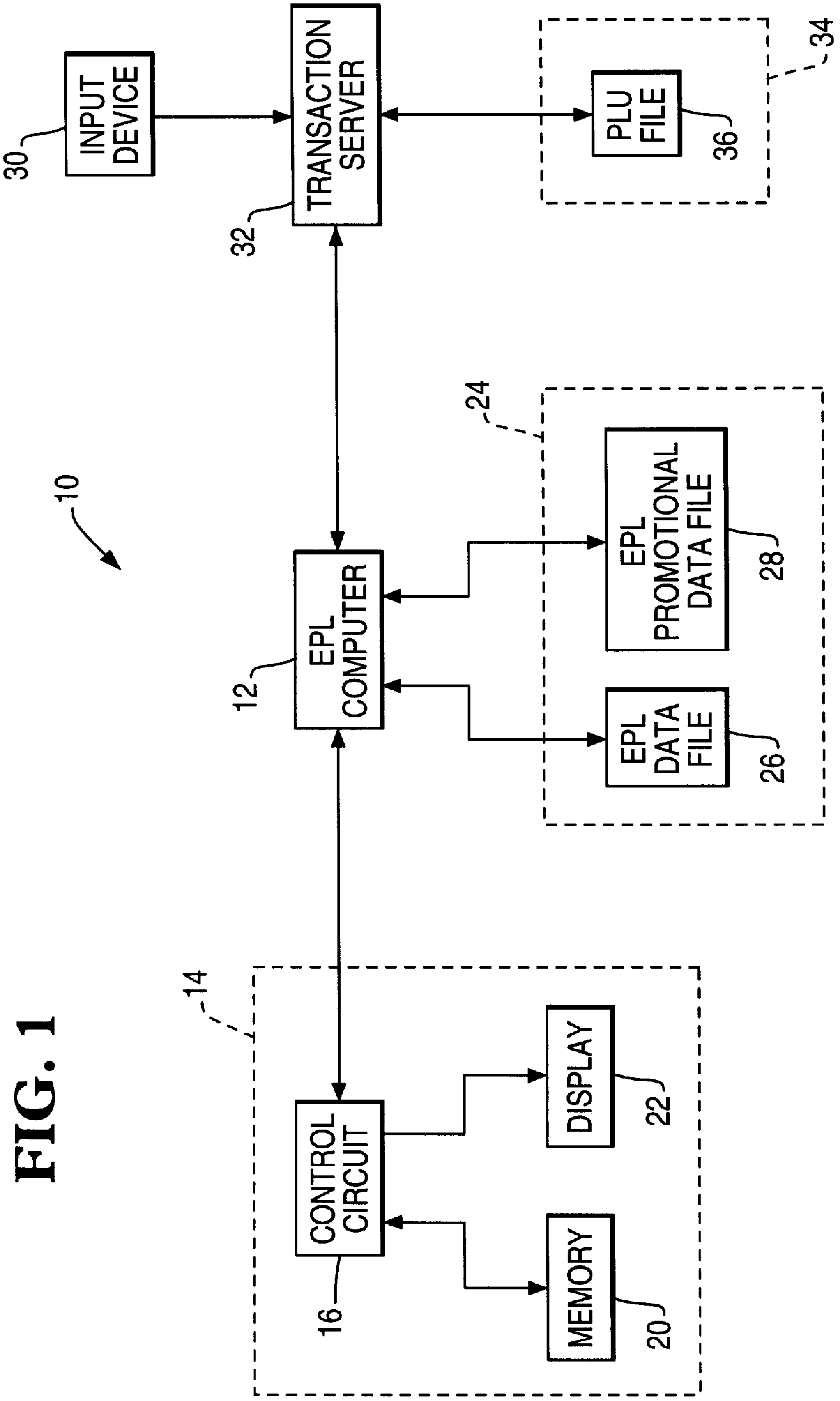
FIG. 1 is a block diagram of a store system.

Referring now to FIG. 1, store system 10 includes electronic price label (EPL) computer 12 and EPL 14. EPL computer 12 and EPL 14 may communicate with each other using wireless communication, cable communication, or a combination of both.

EPL computer 12 records, schedules, and transmits all messages to EPL 14 and analyzes status messages from EPL 14. Messages from EPL computer 12 include price change messages and diagnostic messages.

EPL computer 12 transmits a message containing a promotional message from EPL promotional data file 28.

Promotional data within EPL promotional data file 28 include promotional messages and a promotional indicator which uniquely identifies each promotional message. Promotional messages may include text and/or graphic images, such as promotional icons, which are typically found on paper shelf talkers. Control circuit 16 may display price separately, or as an integral part of a promotional message. The promotional messages and promotional indicators are arranged as a table in EPL promotional data file, such as the one shown below as Table I.

TABLE I

| Indicator | Promotional Message |
|---|---|
| 00 | (No message) |
| 01 | (icon) |
| 02 | BUY TWO/ GET TWO (blinking) |
| 03 | EVERYDAY LOW PRICE |
| 04 | (Both of Messages 01 and 03 displayed) |

EPL computer 12 maintains and uses EPL data file 26, which contains item information, identification information, item price verifier information, and status information for EPL 14 and other EPLs within system 10.

Storage medium 24 stores EPL data file 26 and EPL promotional data file 28.

EPL 14 is one of many EPLs within system 10. EPL 14 includes control circuit 16, memory 20, and display 22.

Control circuit 16 controls the internal operation of EPL 14. Control circuit 16 stores received messages from EPL computer 12 and transmits response messages to EPL computer 12. Control circuit 16 also controls the display of price and promotional messages, including blinking.

Upon receiving a message containing a promotional message, control circuit 16 stores the promotional message in memory 20 and displays the promotional message using display 22.

Memory 20 stores promotional messages and other data necessary for the proper operation of system 10.

Display 22 displays price and promotional messages. Display 22 is preferably a liquid crystal display (LCD).

Transaction server 32 is a host to a plurality of transaction terminals and its primary function is to provide price and item information to the transaction terminals from a price look-up (PLU) file 36. Transaction server 32 and EPL computer 12 may also be one computer.

Under the method of the present invention, PLU file 36 also contains promotional indicators for preselected items. Promotional indicators may be added to PLU file 36 by an operator using input device 30. Input device 30 may be a keyboard or other suitable input device.

Storage medium 34 contains PLU file 36.

Figure 2:
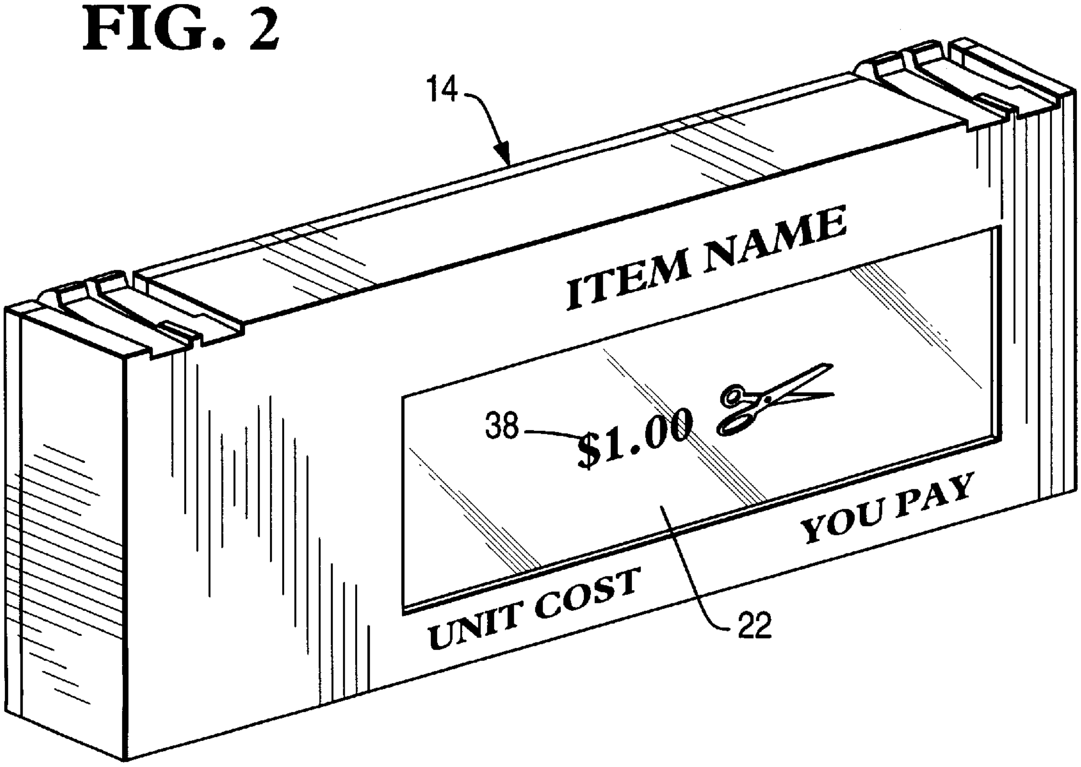
FIG. 2 is a perspective view of an EPL displaying a promotional icon.

Turning now to FIG. 2, EPL 14 is shown in more detail. The promotional message 38 is shown as a scissors icon and is associated with promotional indicator "01".

Figure 3:
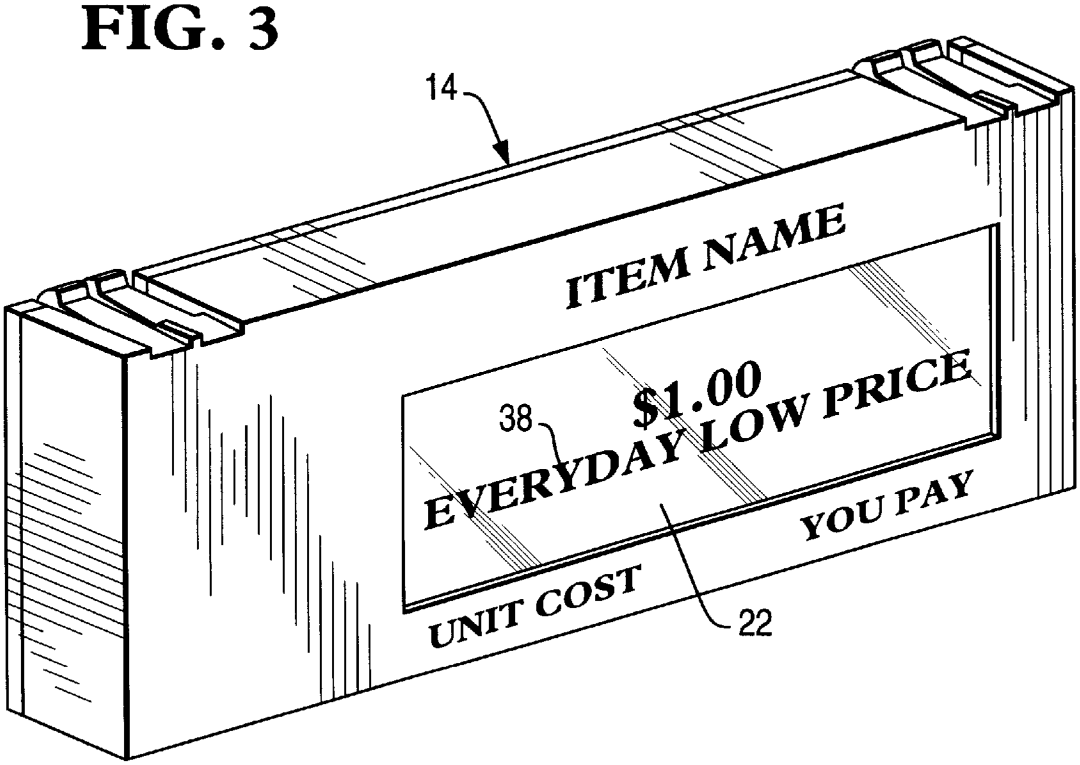
FIG. 3 is a perspective view of an EPL displaying a promotional message.

Turning now to FIG. 3, EPL 14 is displaying promotional message "Everyday Low Price", which is associated with promotional indicator "03".

Figure 4:
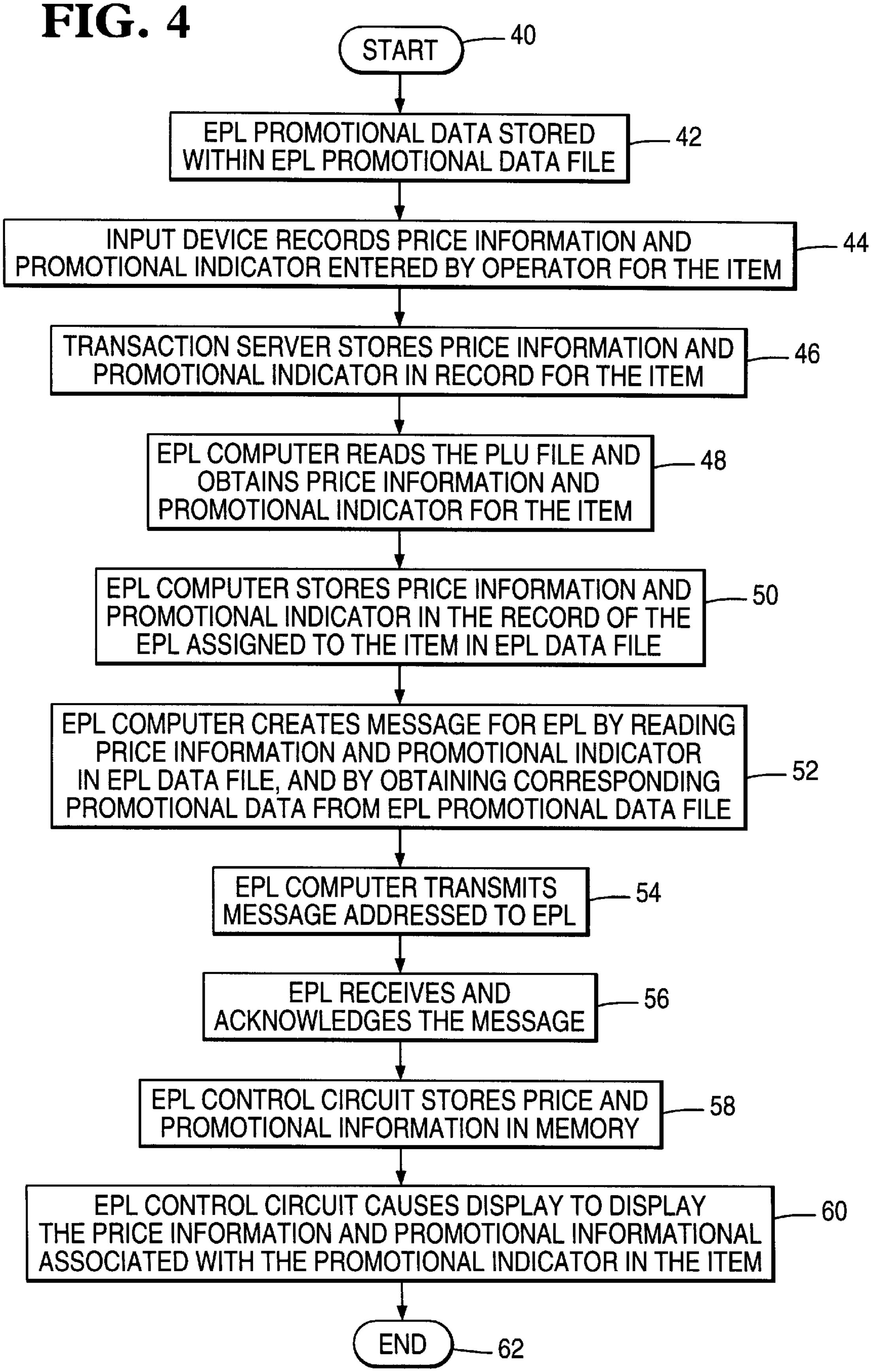
FIG. 4 is a flow diagram illustrating a method of displaying a promotional message.

Turning now to FIG. 4, a method of displaying promotional messages begins with START 40.

In step 42, EPL promotional data is stored within EPL promotional data file 28.

In step 44, input device 30 records a promotional indicator and optionally new price information entered for an item by an operator.

In step 46, transaction server 32 stores the promotional indicator and any new price information in the item's record in PLU file 36.

In step 48, EPL computer 12 reads PLU file 36 and obtains the promotional indicator and price information.

In step 50, EPL computer 12 stores the promotional indicator and price information in EPL data file 26.

In step 52, EPL computer 12 creates a message for EPL 14 by reading the promotional indicator and price information in EPL data file 26. EPL computer 12 obtains a promotional message corresponding to the item's promotional indicator from EPL promotional data file 28.

In step 54, EPL computer 12 transmits the message addressed to EPL 14.

In step 56, EPL 14 receives and acknowledges the message.

In step 58, control circuit 16 stores the price information and promotional message in memory 20.

In step 60, control circuit 16 causes display 22 to display the price information and the promotional message associated with the promotional indicator.

In step 62, the method ends.

Although the present invention has been described with particular reference to certain preferred embodiments thereof, variations and modifications of the present invention can be effected within the spirit and scope of the following claims.

What is claimed is:

1. A method of displaying a promotional message by an electronic price label (EPL) comprising the steps of:

storing the promotional message with a promotional indicator associated with the promotional message in a first location;

storing the promotional indicator in a second location;

creating a control message addressed to the EPL including the substeps of reading the promotional indicator for the EPL from the second location; and reading the promotional message from the first location;

wirelessly transmitting the control message to the EPL;

receiving the control message by the EPL; and electronically displaying the promotional message by the EPL.

2. The method as recited in claim 1, wherein the second location is a price look-up (PLU) file.

3. The method as recited in claim 1, wherein the second location is an EPL data file.

4. A method of displaying a promotional message by an electronic price label (EPL) comprising the steps of:

storing the promotional message and a promotional indicator associated with the promotional message in a promotional data file;

storing the promotional indicator in a price look-up (PLU) file;

reading the PLU file to obtain the promotional indicator;

storing the promotional indicator in an EPL data file;

creating a message addressed to the EPL including the substeps of reading the promotional indicator for the EPL from the EPL data file; and reading the promotional data file to obtain the promotional message;

wirelessly transmitting the message to the EPL;

receiving the message by the EPL; and electronically displaying the promotional message by the EPL.

5. An electronic price label (EPL) for displaying a promotional message comprising:

a control circuit;

a memory;

a receiver for receiving a wirelessly transmitted control message including the promotional message; and an electronic display which displays the promotional message subject to control of the control circuit which also causes the promotional message to be stored in the memory.

6. An electronic price label (EPL) for displaying a promotional message associated with a promotional indicator comprising:

an EPL including an electronic display which displays the promotional message for an item associated with the EPL; and a computer which transmits a control message which is addressed to the EPL and which contains the promotional message for the promotional indicator associated with the item.

7. The system as recited in claim 6, further comprising:

a table which links the promotional indicator with the promotional message; and a price look-up (PLU) file which contains a record of the item including the promotional indicator;

wherein the computer reads the PLU file and the table to obtain the promotional message for transmission to the EPL.

8. The system as recited in claim 7, further comprising:

an EPL data file which contains a record of the EPL including the promotional indicator;

wherein the computer reads the PLU file for the promotional indicator for the item, copies the promotional indicator to the EPL data file, reads the EPL data file and the table to obtain the promotional message for transmission to the EPL.

9. The method of claim 1 further comprising the steps of:

wirelessly transmitting a price for an item associated with the EPL obtained from a price look-up (PLU) file; and electronically displaying the price for the item by the EPL.

10. The method of claim 1 wherein the promotional message is a promotional icon for an item associated with the EPL.

11. The method of claim 1 wherein the promotional message indicates "Every Day Low Price" for an item associated with the EPL.

12. The method of claim 1 further comprising the step of:

updating the second location to store the promotional indicator for a new item.

13. The system of claim 6 wherein the computer wirelessly transmits a price of an item associated with the EPL and the EPL electronically displays both the promotional message and the price of the item.

14. The system of claim 13 wherein the price is stored in a price look up (PLU) file.

* * * * *